3,422,556
IDENTIFICATION MARKER
Delbert T. Lyons and Wallace F. Manning, both of 6318 Grovewood, Houston, Tex. 77008
Filed Dec. 29, 1966, Ser. No. 605,672
U.S. Cl. 40—10                                    2 Claims
Int. Cl. G09f 3/18; G09f 7/02; G09f 7/16

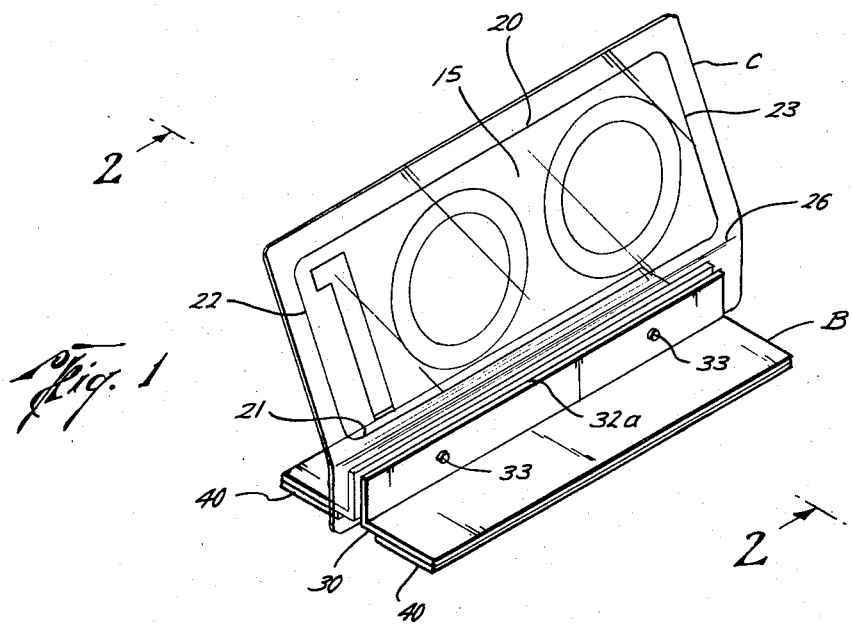
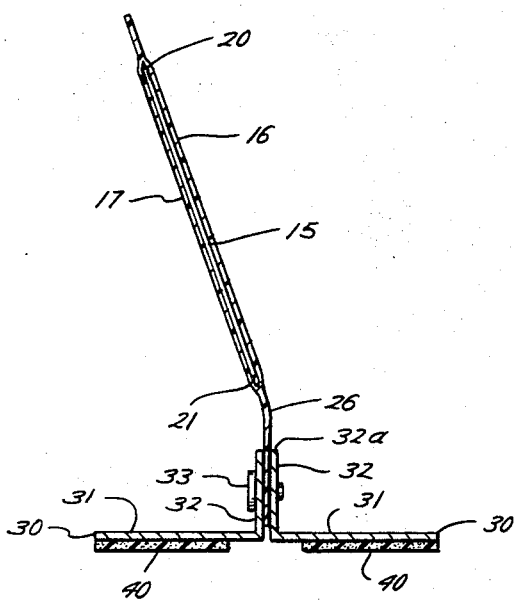
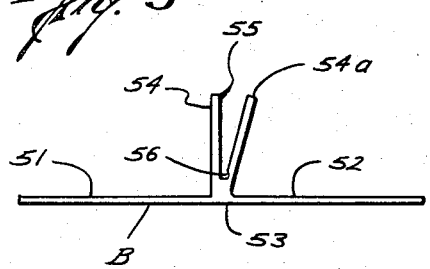
Delbert T. Lyons
Wallace F. Manning
INVENTORS
BY Hayden & Pravel
ATTORNEYS United States Patent Office 3,422,556
Patented Jan. 21, 1969

ABSTRACT OF THE DISCLOSURE

An identification marker for use on automobiles or other magnetic objects comprising an elastically hinged upstanding portion having indicia thereon, and a magnetized base member on which such upstanding portion is mounted.

Background of the invention

Heretofore, numbered cards or other markers have been used in automobile dealers' facilities, repair garages, service stations, and other facilities where there is a problem of identifying the various automobiles or other vehicles; however, such cards are usually either placed on the front seat of the car, hung on the rear view mirror either inside or outside of the car or placed at some other location in or on the automobile. In those instances in which the markers have been placed inside of the vehicles, it has been difficult to read the identifying number without approaching to within very close range of the automobile or other vehicle in which the identifying card or number is used. In those instances in which a marker has been placed on the outside of the car, the markers have been unstable and have often been blown or knocked over so that the identifying numerals or legends could not be viewed by a person at any distance from the worker.

Summary of the invention

The present invention provides a new and improved identification tag or marker which may be removably secured on a fender, hood, roof, or other external surface of an automobile or other object and wherein such marker is stable in a selected position on the object so that the numerals or other indicia thereon can be easily seen at substantial distances from the marker.

Another object of this invention is to provide a new and improved identification marker having a magnetic base on which an upright legend bearing portion is mounted for securing such marker to an automobile or other magnetic object so that the marker will remain in any selected position even when subjected to relatively high wind forces while at the same time being readily removable manually when desired.

A specific object of the present invention is to provide a new and improved automobile identification tag having an elastically hinged marker portion carried on a magnetic base which may be removably secured to the exterior of an automobile so that it will remain in place even when the automobile is operated at highway speeds.

The preferred embodiment of this invention will be described hereinafter together with other features thereof, and additional objects will become evident from such description.

The invention will be more readily understood from a reading of the following specification and by reference to the accompanying drawings forming a part thereof wherein an example of the invention is shown and wherein:

Brief description of the drawing

FIG. 1 is an isometric view of the temporary marker of the present invention showing the flexible upright portion mounted on the magnetic base and slightly deflected from its normally vertical position;

FIG. 2 is a sectional view taken on line 2—2 of FIG. 1 showing details of construction of the apparatus of this invention; and FIG. 3 is a lateral sectional view of an alternate embodiment of the base portion of the apparatus of this invention.

Description of the preferred embodiments

Briefly, the apparatus of the present invention comprises a rigid magnetized base member B which is secured to the lower edge portion of an elastically hinged upright card or legend bearing member C which is normally vertical and substantially perpendicular to the horizontal portions of the base member B.

Considering now the apparatus of the present invention in more detail, the legend bearing card portion C which is best seen in FIG. 2 of the drawings preferably comprises an inner card or marker element 15 which is disposed, and preferably bonded, between a pair of outer transparent plastic sheets 16 and 17 to form a laminated sealed construction. As shown, the card portion 15 may be inscribed or imprinted on one or both sides with numerals 16 or other identifying information and is generally rectangular having substantially parallel upper and lower edges 20 and 21 and substantially parallel sides 22 and 23. The plastic sheets 16 and 17, respectively, extend beyond the edges 20, 21, 22, and 23 of the card 15 and are bonded or glued or otherwise sealed together around the borders of such card 15 to form an airtight or moistureproof enclosure to protect the card 15. As best seen in FIG. 2 of the dawings, the lower border portion 26 where the plastic sheets 16 and 17 are joined together is thinner and more flexible than that portion of the card C where the plastic sheets 16 and 17 surround the card 15.

The base B includes a pair of longitudinal right angle members 30 which normally extend longitudinally substantially the full length of the card portion C. Such right angle members 30 comprise generally horizontally disposed base portions 31 and substantially vertical or upright side members 32. As best seen in FIG. 2 of the drawings, such right angle members 30 are disposed parallel to each other and arranged so that the upstanding side portion 32 of one member is adjacent the corresponding upstanding side portion 32 of the other right angle member 30.

In a preferred form of this invention, the lower margin portion 26 of the laminated plastic sheets 16 and 17 is disposed between such upstanding sides 32. The adjacent side members 32 are pressed or squeezed tightly together by means of suitable brads or screws 33 to thereby secure the legend bearing card C in the base member B.

Also, in the preferred form of this invention, strips 40 of rubber tape or other relatively soft pliable material having magnetic particles imbedded therein are attached to the lower surface of the laterally extending bottom members 31 by means of glue or mastic or other suitable attaching means to provide magnetic means therewith for temporarily securing the base B to an automobile or other magnetic object. Also, it will be appreciated that the relatively soft rubber strips 40 serve to protect the painted finish on the automobile against scratching or marring by use of the rigid base member B thereon.

It is important to note that the lower edge 21 of the card 15 is disposed above the upper edges 32a of the uprights 32 so that the relative thin portion 26 provides an elastic hinge which is resilient enough to bend laterally when a lateral bending force is imposed thereon and yet has sufficient elasticity to return to a substantially upright position when such bending force is no longer acting thereon. Thus, when a bending force such as a wind force is applied to the upright card portion C, the lateral pivoting or deflection in the lower margin portion 26 between the lower edge 21 of the card 15 and the upper edge 32a of the upright member 32 occurs without disturbing the holding action of the magnetic strips 40 on the car top or other object. Therefore, when the temporary marker is in use, such as on an automobile and is inadvertently touched or struck by a mechanic or by some object or is subjected to wind pressure while the automobile on which it is being used is in motion, the marker of this invention remains stable in its selected position so that it can be readily viewed by an observer at substantial distances.

In FIG. 3 of the drawings, an alternate embodiment is shown wherein the base portion B' of the apparatus of this invention is formed as a single member. As shown, the base member B' comprises a pair of laterally extending leg members 51 and 52 which together form a single substantially flat bottom surface 53. An upright member 54 which extends substantially vertically upwardly from the juncture of the laterally extending leg members 51 and 52 is provided with a longitudinally extending slot or cut 55 for receiving the lower margin portion 26 of the card C. A groove 56 is provided at the bottom of the slot 55 adjacent the inclined leg 54a of the upright member 54 to facilitate bending such leg portion 54a. When the base member B' is used, the lower margin portion 26 of the card C is inserted into the slot 55, and the leg 54a is bent toward the upright member 54 to pinch or grip the edge portion 26 therebetween. As in FIGS. 1 and 2, the lower edge 21 of the card 15 is disposed above the upper edges of the legs 54 and 54a so as to provide the flexible portion 26 between the base B' and the card C to thereby permit the card C and its enclosing plastic to bend back and forth at the elastic hinge portion 26 without disturbing the magnetic attraction of the base B' or strips 40 therewith which hold the device on the car top or other similar surface. With the alternate embodiment base B', screws or other securing devices (not shown) similar to the screws 33 used with the base member B may be employed for securing the upstanding portion 54, and the inclined leg 54a together to hold the card C, if desired. Also, either the base B' may be formed of magnetic material, or one or more soft pliable strips having magnetized particles therein such as the tape 40 used on the base member B may also be employed for providing magnetic attraction.

The foregoing disclosure and description of the invention are illustrative and explanatory thereof, and various changes in the size, shape, and material as well as in the details of the illustrated construction may be made within the scope of the appended claims without departing from the spirit of the invention.

What is claimed is:
1. An identification marker for use on a magnetic object comprising:
  (a) a substantially rectangular identification marker elements having a lower longitudinal portion of a thickness less than the thickness of the upper portion thereof;
  (b) a substantially flat base extending substantially perpendicular to said marker element;
  (c) a pair of longitudinally extending upright side members extending upwardly from said base and laterally spaced from each other a distance equal to approximately the width of said lower longitudinal portion of said marker element;
  (d) said lower longitudinal portion of said marker element having a portion thereof clamped between said upright side members to provide a rigid connection of said marker element to said upright side members and said base while also providing a portion of said lower longitudinal portion above the upper edges of said upright side members;
  (e) the lesser thickness of said lower longitudinal portion of said marker element which is above said upright side members forming a flexible longitudinally extending hinge along and above the upper edges of said upright members and substantially parallel thereto whereby said marker element may flex about said hinge towards said base member; and
  (f) tape strips of rubber or the like having magnetic particles imbedded therein on the lower surface of said base for releasable engagement thereof with the magnetic object on which the marker is to be used.

2. The structure set forth in claim 1, wherein said base is a single piece and is formed integrally with said upright side members.

References Cited

UNITED STATES PATENTS

| | | | |
|---|---|---|---|
| 1,337,947 | 4/1920 | O'Toole | 40—125 |
| 2,049,820 | 8/1936 | Myhre | 40—2 |
| 2,614,350 | 10/1952 | Kneifel et al. | 40—158 X |
| 3,141,253 | 7/1964 | Bartram | 40—129 |
| 3,237,327 | 3/1966 | Griggs | 40—142 X |
| 3,340,779 | 9/1967 | Mahoney | 40—125 |

EUGENE R. CAPOZIO, Primary Examiner.

WENCESLAO J. CONTRERAS, Assistant Examiner.

U.S. Cl. X.R.
40—129, 142